(12) United States Patent
Todeschini (10) Patent No.: US 10,013,591 B2
(45) Date of Patent: *Jul. 3, 2018

(54) CODE SYMBOL READING SYSTEM HAVING ADAPTIVE AUTOFOCUS

(71) Applicant: Hand Held Products, Inc., Fort Mill, SC (US)

(72) Inventor: Erik Todeschini, Camillus, NY (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/438,116

(22) Filed: Feb. 21, 2017

(65) Prior Publication Data

US 2017/0161533 A1    Jun. 8, 2017

Related U.S. Application Data

(63) Continuation of application No. 14/818,528, filed on Aug. 5, 2015, now Pat. No. 9,582,698, which is a continuation of application No. 13/927,398, filed on Jun. 26, 2013, now Pat. No. 9,104,929.

(51) Int. Cl.
*G06K 5/00* (2006.01)
*G06K 7/10* (2006.01)
*G06K 19/06* (2006.01)

(52) U.S. Cl.
CPC ...... *G06K 7/10811* (2013.01); *G06K 7/10722* (2013.01); *G06K 19/06028* (2013.01)

(58) Field of Classification Search
CPC .......... G06K 7/10811; G06K 7/10801; G06K 2207/1011; G02B 3/14
USPC .................................. 235/462.24
See application file for complete search history.

(56) References Cited

U.S. PATENT DOCUMENTS

| | | |
|---|---|---|
| 6,336,587 B1 | 1/2002 | He et al. |
| 6,832,725 B2 | 12/2004 | Gardiner et al. |
| 7,128,266 B2 | 10/2006 | Zhu et al. |
| 7,159,783 B2 | 1/2007 | Walczyk et al. |
| 7,413,127 B2 | 8/2008 | Ehrhart et al. |
| 7,726,575 B2 | 6/2010 | Wang et al. |
| 8,294,969 B2 | 10/2012 | Plesko |
| 8,317,105 B2 | 11/2012 | Kotlarsky et al. |

(Continued)

FOREIGN PATENT DOCUMENTS

| | | |
|---|---|---|
| WO | 2013163789 A1 | 11/2013 |
| WO | 2013173985 A1 | 11/2013 |
| WO | 2014019130 A1 | 2/2014 |
| WO | 2014110495 A1 | 7/2014 |

OTHER PUBLICATIONS

Examination Report in counterpart United Kingdom Application No. GB1410734.6 dated Oct. 6, 2015, pp. 1-2.

(Continued)

*Primary Examiner* — Claude J Brown
(74) *Attorney, Agent, or Firm* — Additon, Higgins & Pendleton, P.A.

(57) ABSTRACT

A system for reading code symbols includes an imaging subsystem that includes a focusing module and an image processor. The image processor selects an initial, predicted focal distance for the imaging subsystem's focusing module with respect to a code symbol. The focal distance for each successfully decoded code symbol is stored in memory, and a weighted average of a pre-selected number of memorized focal distances is used to calculate the next initial, predicted focal distance.

20 Claims, 2 Drawing Sheets

(56) References Cited

U.S. PATENT DOCUMENTS

| | | |
|---|---|---|
| 8,322,622 B2 | 12/2012 | Liu |
| 8,366,001 B2 | 2/2013 | Craen et al. |
| 8,366,005 B2 | 2/2013 | Kotlarsky et al. |
| 8,371,507 B2 | 2/2013 | Haggerty et al. |
| 8,376,233 B2 | 2/2013 | Van Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,608,075 B2 | 12/2013 | Tanimoto et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,651,384 B2 | 2/2014 | Ogawa et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |

(56) References Cited

U.S. PATENT DOCUMENTS

| | | |
|---|---|---|
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,104,929 B2 | 8/2015 | Todeschini |
| 9,224,022 B2 | 12/2015 | Ackley et al. |
| 9,224,027 B2 | 12/2015 | Van Horn et al. |
| D747,321 S | 1/2016 | London et al. |
| 9,230,140 B1 | 1/2016 | Ackley |
| 9,250,712 B1 | 2/2016 | Todeschini |
| 9,258,033 B2 | 2/2016 | Showering |
| 9,262,633 B1 | 2/2016 | Todeschini et al. |
| 9,310,609 B2 | 4/2016 | Rueblinger et al. |
| D757,009 S | 5/2016 | Oberpriller et al. |
| 9,342,724 B2 | 5/2016 | McCloskey |
| 9,375,945 B1 | 6/2016 | Bowles |
| D760,719 S | 7/2016 | Zhou et al. |
| 9,390,596 B1 | 7/2016 | Todeschini |
| D762,604 S | 8/2016 | Fitch et al. |
| D762,647 S | 8/2016 | Fitch et al. |
| 9,412,242 B2 | 8/2016 | Van Horn et al. |
| D766,244 S | 9/2016 | Zhou et al. |
| 9,443,123 B2 | 9/2016 | Hejl |
| 9,443,222 B2 | 9/2016 | Singel et al. |
| 9,478,113 B2 | 10/2016 | Xie et al. |
| 9,582,698 B2 | 2/2017 | Todeschini |
| 2004/0118919 A1 | 6/2004 | Breytman et al. |
| 2007/0063048 A1 | 3/2007 | Havens et al. |
| 2007/0131770 A1 | 6/2007 | Nunnink |
| 2009/0072037 A1 | 3/2009 | Good et al. |
| 2009/0134221 A1 | 5/2009 | Zhu et al. |
| 2009/0166426 A1 | 7/2009 | Giebel et al. |
| 2009/0206158 A1 | 8/2009 | Thuries et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2012/0237193 A1 | 9/2012 | Kawarada |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedrao |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0100813 A1 | 1/2014 | Showering |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |

(56) References Cited

U.S. PATENT DOCUMENTS

| | | |
|---|---|---|
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166758 A1 | 6/2014 | Goren |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Lui et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071819 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chang et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |
| 2015/0210199 A1 | 7/2015 | Payne |
| 2015/0220753 A1 | 8/2015 | Zhu et al. |
| 2015/0254485 A1 | 9/2015 | Feng et al. |
| 2015/0327012 A1 | 11/2015 | Bian et al. |
| 2016/0014251 A1 | 1/2016 | Hejl |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0109219 A1 | 4/2016 | Ackley et al. |
| 2016/0109220 A1 | 4/2016 | Laffargue et al. |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0133253 A1 | 5/2016 | Braho et al. |
| 2016/0171720 A1 | 6/2016 | Todeschini |
| 2016/0178479 A1 | 6/2016 | Goldsmith |
| 2016/0180678 A1 | 6/2016 | Ackley et al. |
| 2016/0189087 A1 | 6/2016 | Morton et al. |
| 2016/0125873 A1 | 7/2016 | Braho et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Sewell et al. |
| 2016/0314294 A1 | 10/2016 | Kubler et al. |

OTHER PUBLICATIONS

Search and Exam Report in Application No. GB1410734.6, related to Current Application, dated Dec. 18, 2014, 6 pages.
Examination Report in counterpart United Kingdom Application No. GB1410734.6 dated Jul. 17, 2015, pp. 1-3.
U.S. Appl. No. 13/367,978, filed Feb. 7, 2012, (Feng et al.); now abandoned.

(56) References Cited

OTHER PUBLICATIONS

U.S. Appl. No. 14/277,337 for Multipurpose Optical Reader, filed May 14, 2014 (Jovanovski et al.); 59 pages; now abandoned.
U.S. Appl. No. 14/446,391 for Multifunction Point of Sale Apparatus With Optical Signature Capture filed Jul. 30, 2014 (Good et al.); 37 pages; now abandoned.
U.S. Appl. No. 29/516,892 for Table Computer filed Feb. 6, 2015 (Bidwell et al.); 13 pages.
U.S. Appl. No. 29/523,098 for Handle for a Tablet Computer filed Apr. 7, 2015 (Bidwell et al.); 17 pages.
U.S. Appl. No. 29/528,890 for Mobile Computer Housing filed Jun. 2, 2015 (Fitch et al.); 61 pages.
U.S. Appl. No. 29/526,918 for Charging Base filed May 14, 2015 (Fitch et al.); 10 pages.
U.S. Appl. No. 14/715,916 for Evaluating Image Values filed May 19, 2015 (Ackley); 60 pages.
U.S. Appl. No. 29/525,068 for Tablet Computer With Removable Scanning Device filed Apr. 27, 2015 (Schulte et al.); 19 pages.
U.S. Appl. No. 29/468,118 for an Electronic Device Case, filed Sep. 26, 2013 (Oberpriller et al.); 44 pages.
U.S. Appl. No. 29/530,600 for Cyclone filed Jun. 18, 2015 (Vargo et al); 16 pages.
U.S. Appl. No. 14/707,123 for Application Independent DEX/UCS Interface filed May 8, 2015 (Pape); 47 pages.
U.S. Appl. No. 14/283,282 for Terminal Having Illumination and Focus Control filed May 21, 2014 (Liu et al.); 31 pages; now abandoned.

U.S. Appl. No. 14/705,407 for Method and System to Protect Software-Based Network-Connected Devices From Advanced Persistent Threat filed May 6, 2015 (Hussey et al.); 42 pages.
U.S. Appl. No. 14/704,050 for Intermediate Linear Positioning filed May 5, 2015 (Charpentier et al.); 60 pages.
U.S. Appl. No. 14/705,012 for Hands-Free Human Machine Interface Responsive to a Driver of a Vehicle filed May 6, 2015 (Fitch et al.); 44 pages.
U.S. Appl. No. 14/715,672 for Augumented Reality Enabled Hazard Display filed May 19, 2015 (Venkatesha et al.); 35 pages.
U.S. Appl. No. 14/735,717 for Indicia-Reading Systems Having an Interface With a User's Nervous System filed Jun. 10, 2015 (Todeschini); 39 pages.
U.S. Appl. No. 14/702,110 for System and Method for Regulating Barcode Data Injection Into a Running Application on a Smart Device filed May 1, 2015 (Todeschini et al.); 38 pages.
U.S. Appl. No. 14/747,197 for Optical Pattern Projector filed Jun. 23, 2015 (Thuries et al.); 33 pages.
U.S. Appl. No. 14/702,979 for Tracking Battery Conditions filed May 4, 2015 (Young et al.); 70 pages.
U.S. Appl. No. 29/529,441 for Indicia Reading Device filed Jun. 8, 2015 (Zhou et al.); 14 pages.
U.S. Appl. No. 14/747,490 for Dual-Projector Three-Dimensional Scanner filed Jun. 23, 2015 (Jovanovski et al.); 40 pages.
U.S. Appl. No. 14/740,320 for Tactile Switch For a Mobile Electronic Device filed Jun. 16, 2015 (Barndringa); 38 pages.
U.S. Appl. No. 14/740,373 for Calibrating a Volume Dimensioner filed Jun. 16, 2015 (Ackley et al.); 63 pages.

CODE SYMBOL READING SYSTEM HAVING ADAPTIVE AUTOFOCUS

CROSS-REFERENCE TO RELATED APPLICATIONS

The present application claims the benefit of U.S. patent application Ser. No. 14/818,528 for a Code Symbol Reading System Having Adaptive Autofocus filed Aug. 5, 2015 (and published Nov. 26, 2015 as U.S. Patent Publication No. 2015/0339504), now U.S. Pat. No. 9,582,698, which claims the benefit of U.S. patent application Ser. No. 13/927,398 for a Code Symbol Reading System Having Adaptive Autofocus filed Jun. 26, 2013 (and published Jan. 1, 2015 as U.S. Patent Application Publication No. 2015/0001304), now U.S. Pat. No. 9,104,929. Each of the foregoing patent applications, patent publications, and patents is hereby incorporated by reference in its entirety.

FIELD OF THE INVENTION

The present invention relates to the field of code symbol readers, more specifically, to a code symbol reading system having adaptive autofocus.

BACKGROUND

Mobile computer devices such as smartphones have become an increasingly popular way to scan code symbols (e.g., barcodes) because of their highly functional camera technology as well as their ubiquity. Generally speaking, the greatest challenge when scanning a barcode with a smartphone is first getting the barcode in focus. Presently, most smartphones utilize an autofocus routine that attempts to get an image into focus. This procedure is quite time consuming, principally because the autofocus routine initiates the process without any real sense of the proper focal distance. As a result, the smartphone often spends a great deal of time readjusting the focal distance as it searches for the proper focal setting that will bring the barcode into focus at least enough to read the barcode. Autofocus routines are often hampered in their efforts by excessive motion and poor lighting conditions. This often leads to a significant time delay when scanning a barcode and accounts for the vast majority of the overall scan time.

Therefore, a need exists for a system for reading code symbols that is capable of generating faster readings of code symbols by first making an educated guess at where the focus should be fixed before a barcode scan is attempted.

SUMMARY

Accordingly, in one aspect, the present invention embraces a system for reading code symbols having adaptive autofocus. The system for reading code symbols includes an imaging subsystem for capturing images within the imaging subsystem's field of view. The imaging subsystem includes a focusing module. The system for reading code symbols also includes an image processor. The image processor is configured for selecting an initial, predicted focal distance for the imaging subsystem's focusing module. The image processor is also configured for processing an image of a code symbol captured by the imaging subsystem in order to decode the code symbol. The image processor is also configured for storing in memory the focal distance associated with the decoded code symbol. The image processor is configured to select the initial, predicted focal distance as a function of memorized focal distance(s) associated with previously decoded code symbol(s).

In an exemplary embodiment, the image processor is configured to select the initial, predicted focal distance as a function of a plurality of memorized focal distances associated with previously decoded code symbols.

In another exemplary embodiment, the image processor is configured to perform an autofocus routine if processing the captured image of the code symbol at the initial, predicted focal distance fails to decode the code symbol.

In yet another exemplary embodiment, the image processor is configured to perform an autofocus routine if the number of memorized focal distances associated with previously decoded code symbols is less than a predetermined minimum.

In yet another exemplary embodiment, the imaging subsystem detects the presence of a code symbol within the imaging subsystem's field of view.

In yet another exemplary embodiment, the system for reading code symbols according to the present invention also includes an object detection subsystem for detecting the presence of an object (e.g., an object bearing a code symbol) within the imaging subsystem's field of view.

In yet another exemplary embodiment, the system for reading code symbols according to the present invention also includes a hand-supportable housing. The imaging subsystem and image processor are disposed within the hand-supportable housing.

In yet another exemplary embodiment, the system for reading code symbols according to the present invention also includes an input/output subsystem. The input/output subsystem outputs signals from the system for reading code symbols.

In another aspect, the present invention embraces a system for reading code symbols that includes an imaging subsystem and an image processor. The imaging subsystem captures images within the imaging subsystem's field of view. The imaging subsystem includes a focusing module. The image processor is configured for selecting an initial, predicted focal distance for the imaging subsystem's focusing module with respect to a code symbol, and to process one or more images of a code symbol captured by the imaging subsystem at the initial, predicted focal distance. The image processor is configured to perform an autofocus routine if processing a predetermined number of captured images of a code symbol fails to decode the code symbol. The image processor is also configured to store in memory the focal distance associated with the decoded code symbol if processing a captured image of the code symbol decodes the code symbol. The image processor is configured to select the initial, predicted focal distance as a function of a plurality of memorized focal distances associated with previously decoded code symbols.

In an exemplary embodiment, the image processor is configured to store in memory the initial, predicted focal distance associated with the decoded code symbol if processing a captured image of a code symbol at the initial, predicted focal distance decodes the code symbol.

In another exemplary embodiment, the image processor is configured to perform an autofocus routine if the number of memorized focal distances associated with previously decoded code symbols is less than a predetermined minimum.

In yet another exemplary embodiment, the image processor is configured to process one or more additional captured images of the code symbol after the image processor performs an autofocus routine.

In yet another exemplary embodiment, the imaging subsystem detects the presence of a code symbol within the imaging subsystem's field of view.

In yet another exemplary embodiment, the system for reading code symbols according to the present invention includes an object detection subsystem for detecting the presence of a code symbol within the imaging subsystem's field of view.

In yet another exemplary embodiment, the system for reading code symbols according to the present invention includes a hand-supportable housing. The imaging subsystem and image processor are disposed within the hand-supportable housing.

In yet another exemplary embodiment, the system for reading code symbols according to the present invention includes an input/output subsystem for outputting system signals.

The foregoing illustrative summary, as well as other exemplary objectives and/or advantages of the invention, and the manner in which the same are accomplished, are further explained within the following detailed description and its accompanying drawings.

DETAILED DESCRIPTION

Figure 1:
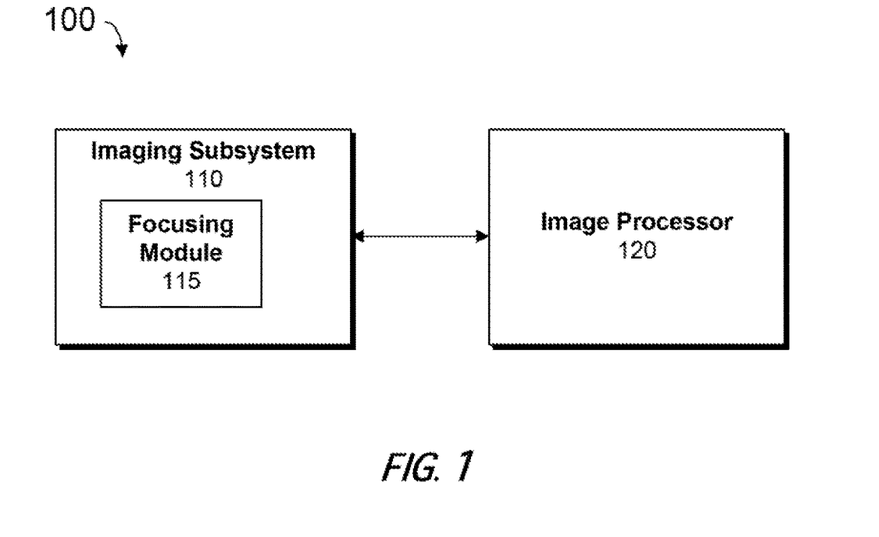
FIG. 1 is a block diagram of an exemplary system for reading code symbols according to the present invention.

The present invention embraces a system for reading code symbols. The term "code symbol" is intended broadly to refer to any indicia or device used to store information about an object, including barcodes, linear barcodes, 1D barcodes, matrix barcodes, 2D barcodes, QR codes, RFID tags, and optical character recognition (OCR) symbols. When a code symbol is read, the information encoded in the code symbol is decoded. Referring now to FIG. 1, the system 100 for reading code symbols according to the present invention includes an imaging subsystem 110. The imaging subsystem 110 captures images within the imaging subsystem's 110 field of view (i.e., angle of view). Objects that can be viewed by the imaging subsystem when it is in a given position and orientation in space are within the imaging subsystem's 110 field of view. When a user wishes to capture an image of a code symbol, the user either positions the code symbol within the imaging subsystem's 110 field of view, or re-orients the imaging subsystem 110 to change its field of view to include the code symbol. For example, if using a camera-equipped smartphone as a code symbol reader, the user could reposition the smartphone until the code symbol comes into the field of view of the smartphone's camera.

The imaging subsystem 110 of the system 100 according to the present invention includes a focusing module 115. The focusing module 115 functions to bring into focus the code symbol of interest such that the code symbol may be read. Typically, the focusing module includes (i) a lens assembly having one or more lenses and (ii) a small autofocus motor which manipulates the lens assembly to adjust its field of focus. The autofocus motor manipulates the lens assembly by changing the distance between the lens assembly and the image plane, or by otherwise adjusting the lens configuration, to bring the code symbol into focus. Alternatively, the focusing module could include a liquid lens module. The liquid lens module has a liquid lens having a chamber containing at least one type of liquid. A liquid lens driver applies an electric current to the liquid, and can vary the focal characteristics of the liquid lens by varying the level of electric current. These types of liquid lens modules are particularly useful in smaller, mobile devices because they do not require moving parts.

The system 100 according to the present invention also includes an image processor 120. Rather than immediately initiating a potentially time-consuming autofocus routine prior to capturing an image of a code symbol, the image processor 120 first selects an initial, predicted focal distance for the imaging subsystem's 110 focusing module 120. In other words, the image processor 120 estimates the focal distance at which the system 100 should attempt to capture the image of the code symbol. The method used to estimate the focal distance is described below in detail.

After an image of a code symbol is captured by the system 100, the image processor 120 processes the image of the code symbol to decode (e.g., read) the code symbol. If the captured image of the code symbol is of sufficient quality (e.g., focal quality) to allow the image processor 120 to successfully decode the code symbol, then the image processor 120 stores in memory the focal distance associated with the decoded code symbol. In other words, when the system 100 captures an image of a code symbol, the image processor 120 (i) determines the focal distance of the focusing module at the time the image was captured, (ii) determines whether the code symbol can be decoded from the captured image, and (iii) stores in memory the focal distance of each successfully decoded code symbol at the time the image was captured. If the image processor 120 determines that the image quality is not sufficient to permit the decoding of the code symbol, the focal length associated with the unsuccessful image capture is not stored in memory. The process is repeated each time the system 100 captures an image of a code symbol, with the focal distance associated with each image capture resulting in a successful decoding being stored in memory. In this way, the system 100 creates a continuously updated record of each of the focal distances employed to decode the code symbol(s). It will be appreciated by a person of ordinary skill in the art that the number of focal distances stored in memory can vary depending on how large of a sample is desired. Prior to capturing an image of a code symbol, the image processor 120 selects the initial, predicted focal distance needed to capture an image that can successfully decode the code symbol. The initial, predicted focal distance is a function of the memorized focal distance(s) associated with the previously decoded code symbol(s).

In an exemplary embodiment of the system 100 for reading code symbols according to the present invention, the image processor 120 selects the initial, predicted focal distance as a function of a plurality of memorized focal distances associated with previously decoded code symbols. Typically, the image processor 120 selects the initial, predicted focal distance that will be used for the current scan operation (e.g., code symbol image capture) by calculating a weighted moving average of the memorized focal distances. Typically, the image processor 120 keeps a record of the temporal order of memorized focal distances. In other words, the image processor 120 records which focal distance is associated with the most recently captured image, which focal distance is associated with the next most recently captured image, and so on. Using this temporal information, the image processor 120 typically gives greater weight to the focal distances associated with the more recently captured images. This approach is particularly advantageous when reading code symbols from varying distances, because this weighted average approach assumes that the distance of the next code symbol to be scanned will be roughly the same as the distances of the latest successful scans. Because, in many instances, when a user is scanning multiple code symbols in succession, those code symbols will be at similar distances from the system 100, the approach of more heavily weighting the more recent scans typically yields improved results. For example, a worker holding the system in hand while scanning various boxes bearing a code symbol while the boxes are resting on a table of substantially uniform height would likely achieve improved results using this method since most of the code symbols will be at roughly the same distance from the system 100. Any weighting scheme could be applied to find an optimal balance between highly valuing the most recent focal length data while still taking into account focal length data over a longer trend. By way of example, a linear weighting system could be employed. By way of further example, the image processor 120 could employ an exponentially weighted moving average, which would place greater value on the focal distance associated with the most recent scan while taking into consideration all of the memorized focal distances.

In an exemplary embodiment, the image processor 120 first seeks to successfully decode an image by initiating a scan using the initial, predicted focal distance. If the image processor 120 fails to decode the image using the initial, predicted focal distance (for example, because the image is out of focus), the image processor retries the scan attempt using a traditional autofocus routine. In this way, the system 100 seeks to expedite the scanning process by first attempting to decode the code symbol using the faster, educated estimate approach described herein; if that approach is not successful, the system 100 falls back on a traditional autofocus routine.

In another exemplary embodiment, the image processor 120 first checks to see if a sufficiently large sample size of focal distances are stored in memory. If less than a predetermined minimum number of memorized focal distances associated with previously decoded code symbols reside in memory, then the image processor 120 does not attempt to generate an initial, predicted focal distance. Instead, the image processor 120 goes directly to the traditional autofocus routine to attempt to decode the code symbol. In this way, if the available data set of focal distances is below a predetermined minimum number deemed to be sufficient to generate a reliable (e.g., useful) initial, predicted focal distance, the image processor 120 will not waste time or system resources on an estimation step that is unlikely to yield an image with a suitable focal quality.

In an exemplary embodiment, the imaging subsystem 110 detects the presence of a code symbol within the imaging subsystem's 110 field of view. The presence of a code symbol may be detected by an analysis of the image pixels by the imaging subsystem 110 to determine if they are consistent with the presence of a code symbol. This analysis may be capable of detecting the presence of a code symbol even when the image quality is insufficient to support reading the code symbol. If the imaging subsystem 110 detects a code symbol within the field of view of the imaging subsystem 110, it initiates an image capture using the focal distance estimating techniques described herein.

Figure 2:
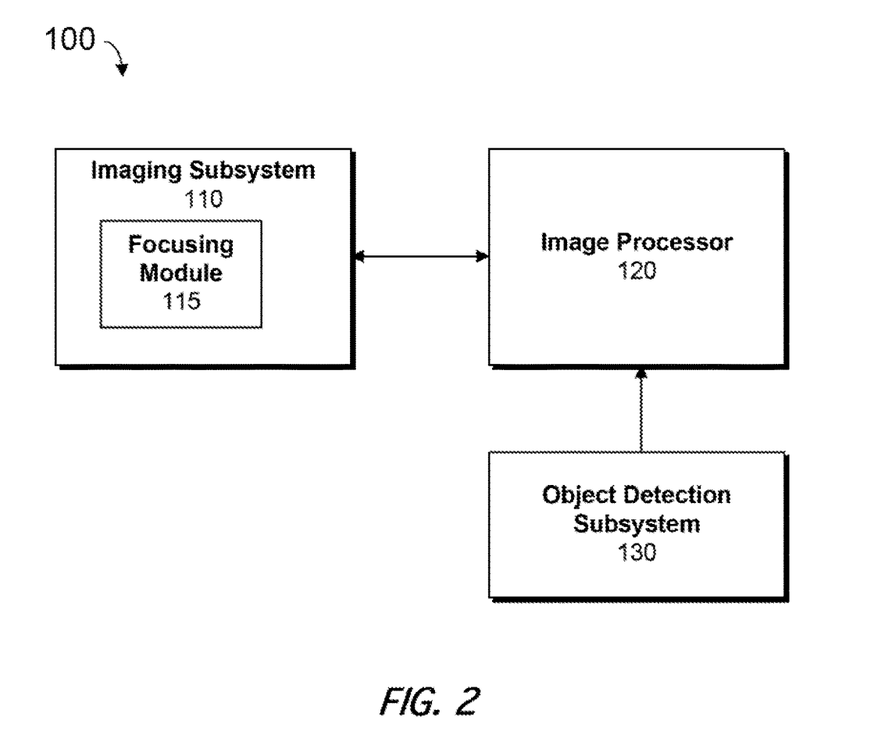
FIG. 2 is a block diagram of a first alternative embodiment of the system for reading code symbols according to the present invention.

Referring now to FIG. 2, in an alternative embodiment, the system 100 for reading code symbols includes an object detection subsystem 130 for detecting the presence of an object (e.g., an object bearing a code symbol) within the system's 100 field of view. The object detection subsystem can project an IR-based light beam into the field of view and detect a return signal from an object present in the field of view to detect the presence of that object. Upon detection of an object, the system 100 may initiate the attempted reading of a code symbol(s) within the field of view using the adaptive focusing techniques described herein.

Figure 3:
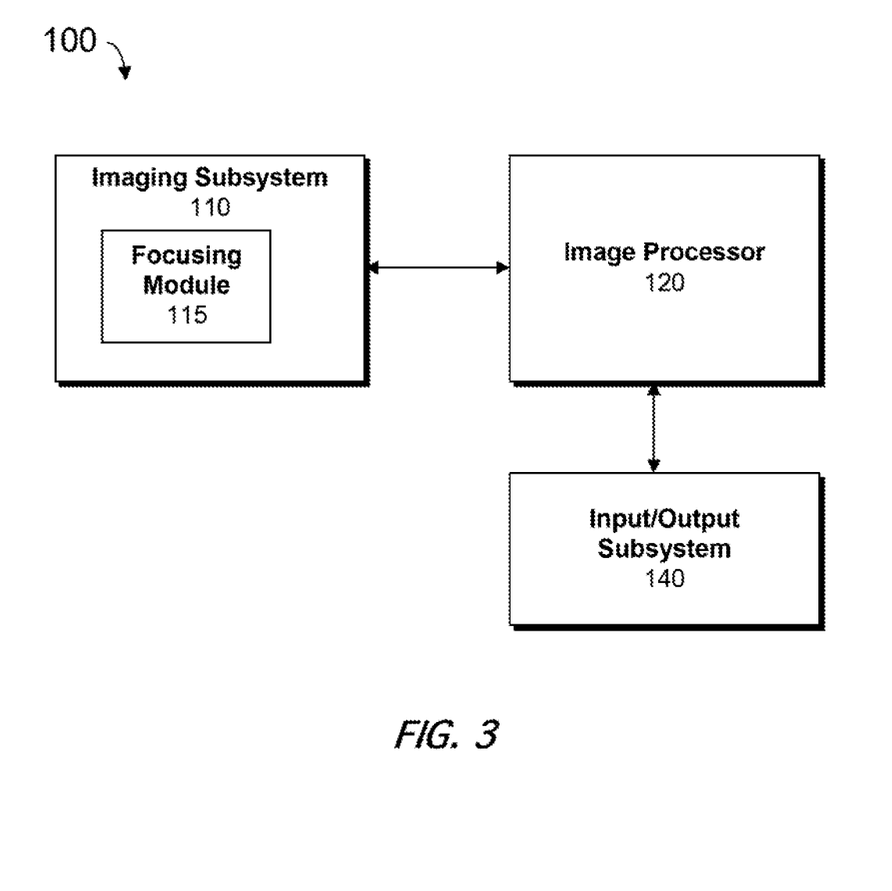
FIG. 3 is a block diagram of a second alternative embodiment of the system for reading code symbols according to the present invention.

Whether by successfully relying on the initial, predicted focal distance, or by falling back on a traditional autofocus routine, the system 100 ultimately obtains a successful scan of the code symbol. When the code symbol is decoded, the system 100 will need to output the resulting data (e.g., the data decoded from the code symbol) to another system (e.g., a data processing system). The data processing system may be housed either within the same device that houses the system 100 for reading code symbols, or it may be housed in a separate device (e.g., a host device). Referring now to FIG. 3, to output the system signals (e.g., data, bits, electrical signals) representing the data generated by decoding the code symbol, the system 100 includes an input/output subsystem 140. The input/output subsystem 140 manages the sending of system signals to other systems and/or devices.

The system 100 for reading code symbols according to the present invention may take a variety of forms. For instance, the system 100 may be a stationary unit at a checkout register (e.g., point of sale (POS)), similar to a bioptic scanner found in most grocery stores. More typically, the system 100 for reading code symbols according to the present invention will take the form of a hand-held device such as a smartphone, a tablet computer, or a hand-held scanner. For hand-held devices, the system 100 according to the present invention includes a hand-supportable housing in which the imaging subsystem 110 and the image processor 120 are disposed.

In another aspect, the present disclosure embraces a system 100 for reading code symbols that includes an imaging subsystem 110 and an image processor 120. The image processor 120 selects an initial, predicted focal distance for the imaging subsystem's 110 focusing module with respect to a code symbol. The image processor 120 processes one or more images of the code symbol captured by the imaging subsystem 110 at the initial, predicted focal distance. If, after processing a predetermined number of captured images of the code symbol, the image processor 120 fails to decode the code symbol, then the image processor 120 performs an autofocus routine. On the other hand, if the image processor 120 is able to decode a code symbol from a captured image, then the image processor 120 stores in memory the focal distance associated with the decoded code symbol. The image processor 120 selects the initial, predicted focal distance as a function of a plurality of memorized focal distances associated with previously decoded code symbols.

To supplement the present disclosure, this application incorporates entirely by reference the following patents, patent application publications, and patent applications: U.S. Pat. No. 6,832,725; U.S. Pat. No. 7,159,783; U.S. Pat. No. 7,413,127; U.S. Pat. No. 7,726,575; U.S. Pat. No. 8,390,909; U.S. Pat. No. 8,294,969; U.S. Pat. No. 8,408,469; U.S. Pat. No. 8,408,468; U.S. Pat. No. 8,381,979; U.S. Pat. No. 8,408,464; U.S. Pat. No. 8,317,105; U.S. Pat. No. 8,366,005; U.S. Pat. No. 8,424,768; U.S. Pat. No. 8,322,622; U.S. Pat.

No. 8,371,507; U.S. Pat. No. 8,376,233; U.S. Pat. No. 8,457,013; U.S. Pat. No. 8,448,863; U.S. Pat. No. 8,459,557; U.S. Pat. No. 8,469,272; U.S. Patent Application Publication No. 2012/0111946; U.S. Patent Application Publication No. 2012/0223141; U.S. Patent Application Publication No. 2012/0193423; U.S. Patent Application Publication No. 2012/0203647; U.S. Patent Application Publication No. 2012/0248188; U.S. Patent Application Publication No. 2012/0228382; U.S. Patent Application Publication No. 2012/0193407; U.S. Patent Application Publication No. 2012/0168511; U.S. Patent Application Publication No. 2012/0168512; U.S. Patent Application Publication No. 2010/0177749; U.S. Patent Application Publication No. 2010/0177080; U.S. Patent Application Publication No. 2010/0177707; U.S. Patent Application Publication No. 2010/0177076; U.S. Patent Application Publication No. 2009/0134221; U.S. Patent Application Publication No. 2012/0318869; U.S. Patent Application Publication No. 2013/0043312; U.S. Patent Application Publication No. 2013/0068840; U.S. Patent Application Publication No. 2013/0070322; U.S. Patent Application Publication No. 2013/0075168; U.S. Patent Application Publication No. 2013/0056285; U.S. Patent Application Publication No. 2013/0075464; U.S. Patent Application Publication No. 2013/0082104; U.S. Patent Application Publication No. 2010/0225757; U.S. patent application Ser. No. 13/347,219 for an OMNIDIRECTIONAL LASER SCANNING BAR CODE SYMBOL READER GENERATING A LASER SCANNING PATTERN WITH A HIGHLY NON-UNIFORM SCAN DENSITY WITH RESPECT TO LINE ORIENTATION, filed Jan. 10, 2012 (Good); U.S. patent application Ser. No. 13/347,193 for a HYBRID-TYPE BIOPTICAL LASER SCANNING AND DIGITAL IMAGING SYSTEM EMPLOYING DIGITAL IMAGER WITH FIELD OF VIEW OVERLAPPING FIELD OF FIELD OF LASER SCANNING SUBSYSTEM, filed Jan. 10, 2012 (Kearney et al.); U.S. patent application Ser. No. 13/367,047 for LASER SCANNING MODULES EMBODYING SILICONE SCAN ELEMENT WITH TORSIONAL HINGES, filed Feb. 6, 2012 (Feng et al.); U.S. patent application Ser. No. 13/400,748 for a LASER SCANNING BAR CODE SYMBOL READING SYSTEM HAVING INTELLIGENT SCAN SWEEP ANGLE ADJUSTMENT CAPABILITIES OVER THE WORKING RANGE OF THE SYSTEM FOR OPTIMIZED BAR CODE SYMBOL READING PERFORMANCE, filed Feb. 21, 2012 (Wilz); U.S. patent application Ser. No. 13/432,197 for a LASER SCANNING SYSTEM USING LASER BEAM SOURCES FOR PRODUCING LONG AND SHORT WAVELENGTHS IN COMBINATION WITH BEAM-WAIST EXTENDING OPTICS TO EXTEND THE DEPTH OF FIELD THEREOF WHILE RESOLVING HIGH RESOLUTION BAR CODE SYMBOLS HAVING MINIMUM CODE ELEMENT WIDTHS, filed Mar. 28, 2012 (Havens et al.); U.S. patent application Ser. No. 13/492,883 for a LASER SCANNING MODULE WITH ROTATABLY ADJUSTABLE LASER SCANNING ASSEMBLY, filed Jun. 10, 2012 (Hennick et al.); U.S. patent application Ser. No. 13/367,978 for a LASER SCANNING MODULE EMPLOYING AN ELASTOMERIC U-HINGE BASED LASER SCANNING ASSEMBLY, filed Feb. 7, 2012 (Feng et al.); U.S. patent application Ser. No. 13/852,097 for a System and Method for Capturing and Preserving Vehicle Event Data, filed Mar. 28, 2013 (Barker et al.); U.S. patent application Ser. No. 13/780,356 for a Mobile Device Having Object-Identification Interface, filed Feb. 28, 2013 (Samek et al.); U.S. patent application Ser. No. 13/780,158 for a Distraction Avoidance System, filed Feb. 28, 2013 (Sauerwein); U.S. patent application Ser. No. 13/784,933 for an Integrated Dimensioning and Weighing System, filed Mar. 5, 2013 (McCloskey et al.); U.S. patent application Ser. No. 13/785,177 for a Dimensioning System, filed Mar. 5, 2013 (McCloskey et al.); U.S. patent application Ser. No. 13/780,196 for Android Bound Service Camera Initialization, filed Feb. 28, 2013 (Todeschini et al.); U.S. patent application Ser. No. 13/792,322 for a Replaceable Connector, filed Mar. 11, 2013 (Skvoretz); U.S. patent application Ser. No. 13/780,271 for a Vehicle Computer System with Transparent Display, filed Feb. 28, 2013 (Fitch et al.); U.S. patent application Ser. No. 13/736,139 for an Electronic Device Enclosure, filed Jan. 8, 2013 (Chaney); U.S. patent application Ser. No. 13/771,508 for an Optical Redirection Adapter, filed Feb. 20, 2013 (Anderson); U.S. patent application Ser. No. 13/750,304 for Measuring Object Dimensions Using Mobile Computer, filed Jan. 25, 2013; U.S. patent application Ser. No. 13/471,973 for Terminals and Methods for Dimensioning Objects, filed May 15, 2012; U.S. patent application Ser. No. 13/895,846 for a Method of Programming a Symbol Reading System, filed Apr. 10, 2013 (Corcoran); U.S. patent application Ser. No. 13/867,386 for a Point of Sale (POS) Based Checkout System Supporting a Customer-Transparent Two-Factor Authentication Process During Product Checkout Operations, filed Apr. 22, 2013 (Cunningham et al.); U.S. patent application Ser. No. 13/888,884 for an Indicia Reading System Employing Digital Gain Control, filed May 7, 2013 (Xian et al.); U.S. patent application Ser. No. 13/895,616 for a Laser Scanning Code Symbol Reading System Employing Multi-Channel Scan Data Signal Processing with Synchronized Digital Gain Control (SDGC) for Full Range Scanning, filed May 16, 2013 (Xian et al.); U.S. patent application Ser. No. 13/897,512 for a Laser Scanning Code Symbol Reading System Providing Improved Control over the Length and Intensity Characteristics of a Laser Scan Line Projected Therefrom Using Laser Source Blanking Control, filed May 20, 2013 (Brady et al.); U.S. patent application Ser. No. 13/897,634 for a Laser Scanning Code Symbol Reading System Employing Programmable Decode Time-Window Filtering, filed May 20, 2013 (Wilz, Sr. et al.); U.S. patent application Ser. No. 13/902,242 for a System For Providing A Continuous Communication Link With A Symbol Reading Device, filed May 24, 2013 (Smith et al.); U.S. patent application Ser. No. 13/902,144, for a System and Method for Display of Information Using a Vehicle-Mount Computer, filed May 24, 2013 (Chamberlin); U.S. patent application Ser. No. 13/902,110 for a System and Method for Display of Information Using a Vehicle-Mount Computer, filed May 24, 2013 (Hollifield); U.S. patent application Ser. No. 13/912,262 for a Method of Error Correction for 3D Imaging Device, filed Jun. 7, 2013 (Jovanovski et al.) and U.S. patent application Ser. No. 13/912,702 for a System and Method for Reading Code Symbols at Long Range Using Source Power Control, filed Jun. 7, 2013 (Xian et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A system, comprising:
   an imaging subsystem for capturing images within the imaging subsystem's field of view, the imaging subsystem including a focusing module; and
   an image processor configured for:
   selecting an initial, predicted focal distance for the imaging subsystem's focusing module;
   processing an image of a document captured by the imaging subsystem in order to read the document; and
   storing in memory the focal distance associated with the read document;
   calculating a weighted moving average of the stored focal distances; and
   selecting the initial, predicted focal distance based on the calculated, weighted moving average of the stored focal distances.

2. The system according to claim 1, wherein the image processor is configured to perform an autofocus routine if processing the captured image of the document at the initial, predicted focal distance fails to read the document.

3. The system according to claim 1, wherein the image processor is configured to perform an autofocus routine if the number of memorized focal distances associated with previously read documents is less than a predetermined minimum.

4. The system according to claim 1, wherein the imaging subsystem detects the presence of a code symbol within the imaging subsystem's field of view.

5. The system according to claim 1, comprising an object detection subsystem for detecting the presence of an object within the imaging subsystem's field of view.

6. The system according to claim 1, comprising a hand supportable housing, wherein the imaging subsystem and image processor are disposed within the hand supportable housing.

7. The system according to claim 1, comprising an input/output subsystem for outputting system signals.

8. A system, comprising:
   an imaging subsystem for capturing images, the imaging subsystem comprising a focusing module; and
   an image processor configured for:
   selecting an initial, predicted focal distance for the imaging subsystem's focusing module;
   processing an image of a document captured by the imaging subsystem in order to read the document; and
   storing in memory the focal distance associated with the read document;
   wherein the image processor is configured to select the initial, predicted focal distance as a function of memorized focal distances associated with previously read documents if the number of memorized focal distances associated with previously read documents is equal to or greater than a predetermined minimum.

9. The system according to claim 8, wherein the image processor is configured to perform an autofocus routine if processing the captured image of the document at the initial, predicted focal distance fails to read the document.

10. The system according to claim 8, wherein the imaging subsystem detects the presence of a code symbol within the imaging subsystem's field of view.

11. The system according to claim 8, comprising an object detection subsystem for detecting the presence of an object within the imaging subsystem's field of view.

12. The system according to claim 8, comprising a hand supportable housing, wherein the imaging subsystem and image processor are disposed within the hand supportable housing.

13. The system according to claim 8, comprising an input/output subsystem for outputting system signals.

14. A system for reading documents, comprising:
   an imaging subsystem for capturing images within the imaging subsystem's field of view, the imaging subsystem including a focusing module; and
   an image processor configured for:
   selecting an initial, predicted focal distance for the imaging subsystem's focusing module with respect to a document;
   processing one or more images of a document captured by the imaging subsystem at the initial, predicted focal distance;
   if processing a predetermined number of captured images of a document fails to read the document, then performing an autofocus routine; and
   if processing a captured image of the document reads the document, then storing in memory the focal distance associated with the read document;
   calculating a weighted moving average of the focal distances associated with read documents stored in memory;
   selecting the initial, predicted focal distance based on the calculated, weighted moving average of the stored focal distances.

15. The system for reading documents according to claim 14, wherein the image processor is configured to store in memory the initial, predicted focal distance associated with the read document if processing a captured image of a code symbol at the initial, predicted focal distance reads the document.

16. The system for reading documents according to claim 14, wherein the image processor is configured to perform an autofocus routine if the number of memorized focal distances associated with previously read documents is less than a predetermined minimum.

17. The system for reading documents according to claim 14, wherein, the image processor is configured to process one or more additional captured images of the document after the image processor performs an autofocus routine.

18. The system for reading documents according to claim 14, wherein the imaging subsystem detects the presence of a document within the imaging subsystem's field of view.

19. The system for reading documents according to claim 14, comprising an object detection subsystem for detecting the presence of a code symbol within the imaging subsystem's field of view.

20. The system for reading documents according to claim 14, comprising a hand supportable housing, wherein the imaging subsystem and image processor are disposed within the hand supportable housing.

* * * * *